United States Patent [19]

Itoh et al.

[11] Patent Number: 4,736,303

[45] Date of Patent: Apr. 5, 1988

[54] ON-VEHICLE NAVIGATION SYSTEM

[75] Inventors: Hisatsugu Itoh; Yasuyuki Akama, both of Himeji, Japan

[73] Assignee: Mitsubishi Denki Kabushiki Kaisha, Japan

[21] Appl. No.: 849,289

[22] Filed: Apr. 8, 1986

[30] Foreign Application Priority Data

Apr. 9, 1985 [JP] Japan .................................. 60-77108

[51] Int. Cl.[4] ............................................. G06F 15/50
[52] U.S. Cl. .................................... 364/449; 364/444;
340/988; 340/995
[58] Field of Search ............... 364/443, 444, 449, 460,
364/521, 571; 73/178 R; 342/450–452;
340/988, 990, 995

[56] References Cited

U.S. PATENT DOCUMENTS 4,563,685  1/1986  Matsumoto et al. ................ 364/444
4,608,656  8/1986  Tanaka et al. ...................... 364/443
4,642,776  2/1987  Matsumoto et al. ................ 364/444

FOREIGN PATENT DOCUMENTS 58-30616   2/1983  Japan .................................. 364/449
58-204310 11/1983  Japan .................................. 364/449

OTHER PUBLICATIONS

"Cathode-Ray Tube Information Center with Automotive Navigation", *Society of Automotive Engineers, Inc.*, Feb., 1984.
"On-Board Computer System for Navigation, Orientation and Route Optimization", *SAE Technical Paper Series*, Feb. 27–Mar. 2, 1984.

*Primary Examiner*—Gary Chin
*Attorney, Agent, or Firm*—Leydig, Voit & Mayer

[57] ABSTRACT

An on-vehicle navigation system wherein movement components in an easterly or westerly direction and a southerly or northerly direction for each unit running distance are calculated to determine longitudinal and latitudinal variations. A plurality of locations and the longitudinal and latitudinal coordinates representative thereof are stored in memory so as to be retrieved for display. A contraction scale formed of a rectangular periphery enclosing a longitudinal meridian and a latitudinal parallel passing through the starting location and a longitudinal meridian and a latitudinal parallel passing through the destination location is determined on a display unit so that the current position is effectively illustrated on the display.

3 Claims, 8 Drawing Sheets

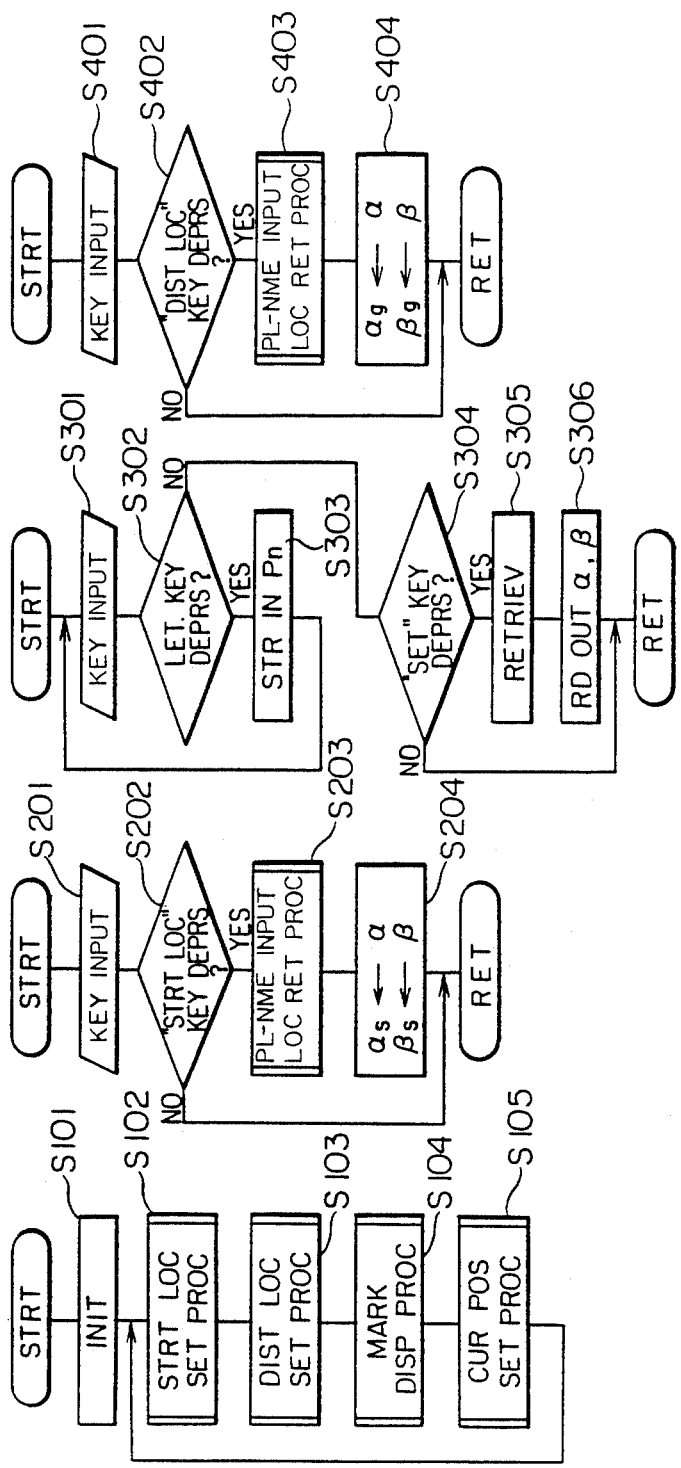

ON-VEHICLE NAVIGATION SYSTEM

BACKGROUND OF THE INVENTION

This invention relates to an on-vehicle navigation system which calculates the geographical position of a vehicle from the planned heading and running distance of the vehicle and which displays the calculated position.

A technique of the specified type has heretofore been, for example, one described in Japanese Patent Application Publication No. 59-28244 wherein a road map is set on a display device, and the changing position of a vehicle is displayed in superposition on the road map through the detection of the heading of the vehicle and the detection of the running distance thereof. A unit running distance of the vehicle is set shorter than a distance corresponding to the basic display interval of the display device in each of the X- and Y-directions thereof, X- and Y-direction components in the running of every unit distance are calculated on the basis of a vehicular detection output so as to cumulatively add and subtract such respective components, and when the cumulative value has reached the distance corresponding to the basic display interval, the display spot of the display device in the X-direction or Y-direction thereof is shifted by one unit.

With the prior art constructed as described above, the errors of the cumulative values of the X- and Y-direction components are small in running within a zone of comparatively small area, but they enlarge in running over a large zone. More specifically, in a case where a vehicle runs from a starting location (a) and along a course (a)-(b)-(c)-(d)-(a) as illustrated in FIG. 10, the lengths of the latitudinal parallels $l_1$ and $l_2$ lying between the longitudinal meridians $K_1$ and $K_2$ are unequal to each other. This leads to the problem that, reven when the vehicle has returned to the starting location (a) after making a round of the course (a)-(b)-(c)-(d)-(a), the calculated value does not agree with the value of the starting location (a), so the disagreement of the display spot arises also on the display device.

SUMMARY OF THE INVENTION

This invention has the objective of overcoming the problem as stated above, and has for its main object to provide an on-vehicle navigation system which can reduce cumulative errors and display errors even in case of running over a large zone.

The on-vehicle navigation system in this invention calculates movement components in a easterly or westerly direction and in a southerly or northerly direction in the running of a vehicle, computes the current position of the vehicle in terms of longitudinal and latitudinal coordinates derived on the basis of the respective movement components, and can display on a display unit a starting location as well as a destination location set by retrieving location information and the current position of the vehicle found by the computation.

BRIEF DESCRIPTION OF THE DRAWINGS

FIGS. 6A–6G are flow charts of programs which are stored in a memory within a microcomputer;

In the drawings, the same symbols indicate identical or corresponding portions.

DESCRIPTION OF THE PREFERRED EMBODIMENT

Figure 1:
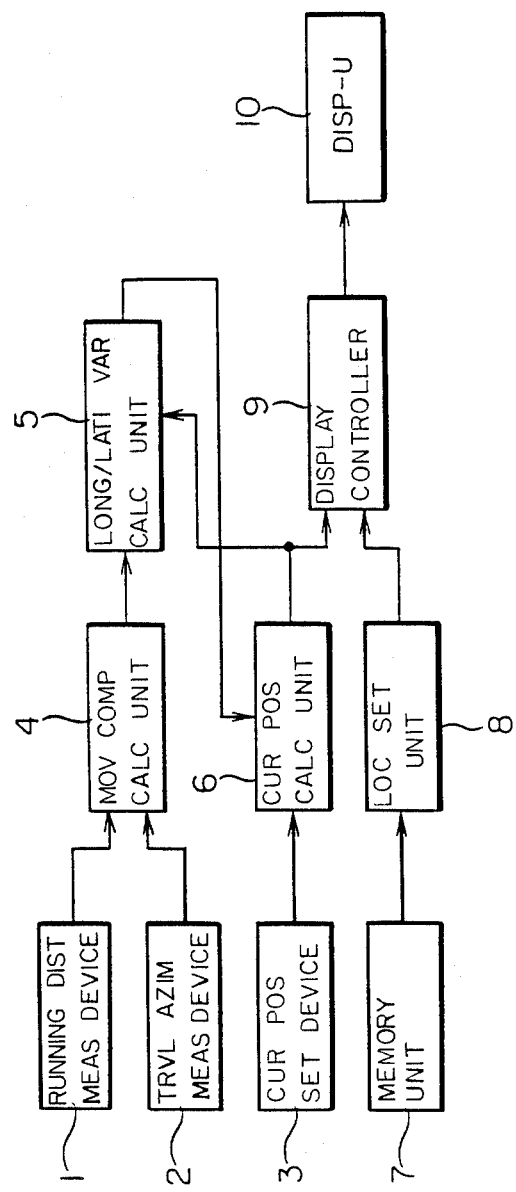
FIG. 1 is a block diagram of an on-vehicle navigation system showing an embodiment of this invention.

FIG. 1 is a block diagram of an on-vehicle navigation system embodying this invention. Referring to the figure, the apparatus comprises running distance detection means including a measuring device 1 to detect or measure the running distance of a vehicle, means having a measuring device 2 to detect or measure the heading heading detection of the vehicle, current position setting means providing a setting device 3 to set the initial longitudinal and latitudinal coordinates of a position of the vehicle, and movement component calculation means in the form of a calculating unit 4 to calculate an easterly or westerly direction-movement component and a southerly or northerly direction-movement component per unit running distance of the vehicle from the running distance and heading obtained by the heading detection means 1 and 2. The apparatus further comprises variation calculation means, herein shown as a calculating unit 5, to calculate longitudinal and latitudinal variations per unit running distance on the basis of the respective direction-movement components obtained by the movement component calculating unit 4 and the latitudinal coordinate of the position of the vehicle at that instant. A current position calculation means, herein shown as a calculating unit 6, is provided to determine current position of the vehicle in such a way that the longitudinal and latitudinal variations per unit running distance of the vehicle obtained by the variation calculating unit 5 are successively added to the initial longitudinal and latitudinal coordinates of the position of the vehicle set by the current position setting device 3. A location information storage means, herein shown as memory unit 7, stores a plurality of location information items corresponding to place names and respective longitudinal and latitudinal coordinates representative thereof. A setting unit 8 designates the place names of the starting location and destination location of the vehicle and sets the designated coordinates of the place names in accordance with the corresponding location information items stored in the memory unit 7. A display control means, generates signals for 9, herein shown as a display controller display on a display unit 10 on the basis of the starting location and destination location set by the location setting unit 8 and the current position of the vehicle obtained by the current position calculating unit 6.

Figure 2:
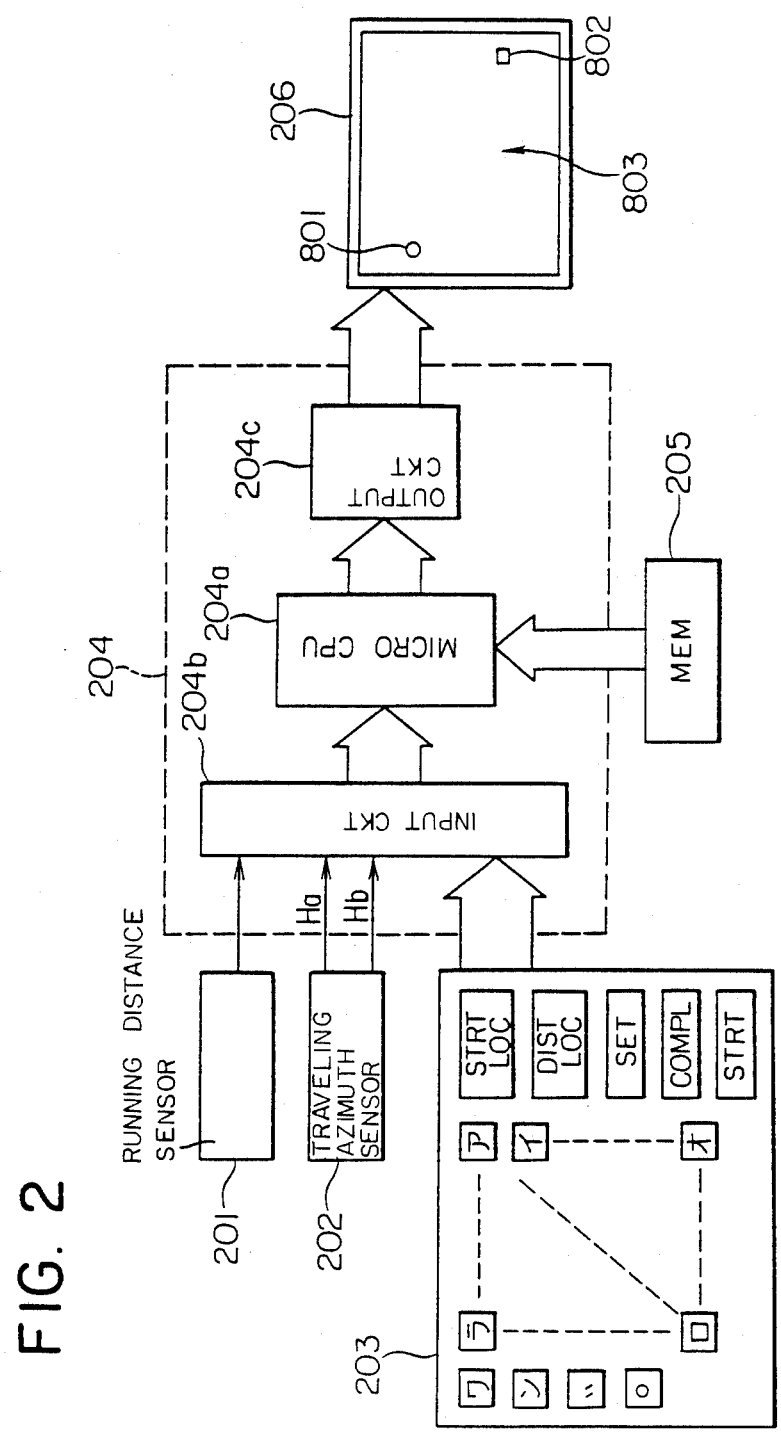
FIG. 2 is a arrangement diagram of hardware.
Figure 3:
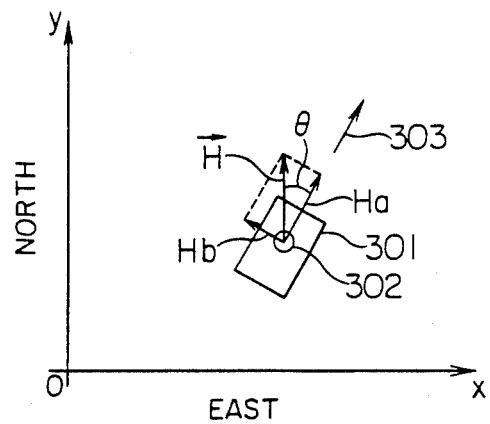
FIG. 3 is a diagram of a traveling azimuth sensor.
Figure 4:
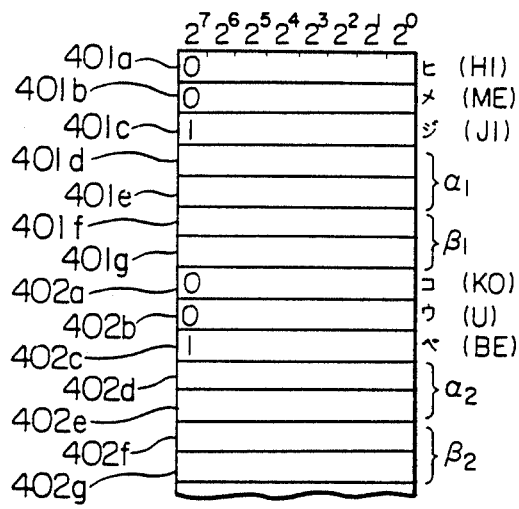
FIG. 4 is a map diagram showing the content of a memory.
Figure 7:
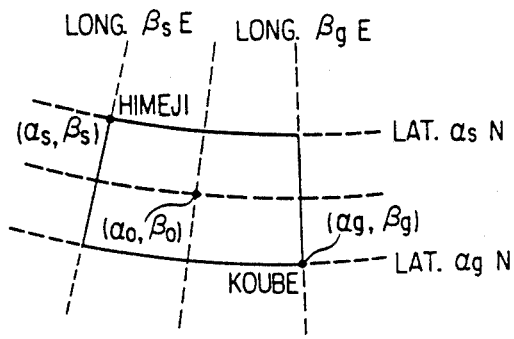
FIG. 7 is a diagram of a starting location and a destination location.

FIG. 2 is an arrangement diagram of the hardware of the apparatus of FIG. 1. The hardware is constructed of a running distance sensor 201, a traveling azimuth or vehicle heading sensor 202, a keyboard 203, a control circuit 204, a memory 205 and a cathode-ray tube 206. The running distance sensor 201 detects the revolutions of a wheel by means of an electromagnetic pickup, a reed switch or the like, and outputs a signal having that number of pulses which is proportional to the revolution number of the wheel. By way of example, using a flux gate type terrestrial magnetism detector 302 which is fixed to a vehicle 301 as shown in FIG. 3, the heading sensor 202 detects a terrestrial magnetism $\overline{H}$ which is decomposed into a component Ha representing the heading of the vehicle 301 and a component Hb perpendicular thereto and outputs signals corresponding to the components. The keyboard 203 includes keys of 'kana' letters (the Japanese syllabary) such as " ァ (A)", " ィ (I)", ... and " ノ (N)"; a voiced sound key " " " and a p-sound key " " (called key letters); and control keys such as "starting location", "destination location", "set", "completion" and "start". The individual keys are sometimes called letter keys " ァ " and " " " and "set" key by way of example. The data items of the keys depressed on the keyboard 203 are loaded in the control circuit 204. The memory 205 is constructed of a ROM by way of example and stores therein location information consisting of place name information and positional information thereof (coordinates based on longitude and latitude), and it has the stored information read out by the control circuit 204. For example, the location information of HIMEJI City (a typical location shall be a location where a city government lies) is stored in memory cells 401a–401g in FIG. 4 showing the memory of the memory 205. In the memory cells 401a–401c, 'HIMEJI' being the place name information is stored by codes which indicate 'kana' letters "HI", "ME" and "JI". Each of the memory cells is constructed of 8 bits. The most significant bits of the respective memory cells 401a–401c serve to indicate that the information items are of the place name information. "1" is assigned to the memory cell 401c storing the last letter of the place name information, while "0" is assigned to the other memory cells 401a and 401b. Accordingly, the 'kana' letter is expressed by the remaining 7 bits of each of the memory cells 401a–401c. Any of voiceless sounds, voiced sounds, p-sounds, double consonants and contracted sounds in 'kana' letters can be expressed with the 7 bits. Besides, the positional information of HIMEJI City is stored in the memory cells 401d–401g in such a manner that the longitude $\alpha$ is stored in the memory cells 401d and 401e and that the latitude $\beta$ is stored in the memory cells 401f and 401g. Likewise, memory cells 402a–402g store the location information of "KOUBE (=KOBE)" (refer to the map of the southern part of HYOUGO Prefecture shown in FIG. 7).

As place names, there are about 680 cities in the whole of Japan. By further including wards, towns, villages, interchanges, stations, castles, lakes, mountain passes, mountains, etc., about 300 place names are prepared per prefecture. Then, there are 13800 place names in all of 46 prefectures except OKINAWA Prefecture. When the average number of letters of the place names is assumed to be 5 and 4 bytes (2 bytes for each of the longitude and the latitude) are assigned to the positional information as stated above, 124200 bytes are required. For storing these data items, four 256-kbit ROMs having the largest capacity among ROMs commercially available at present are needed, but one 1-Mbit ROM is expected to be commercially available in the future. Such a semiconductor memory which is small in size, light in weight and high in reliability is highly desirable.

Figure 5:
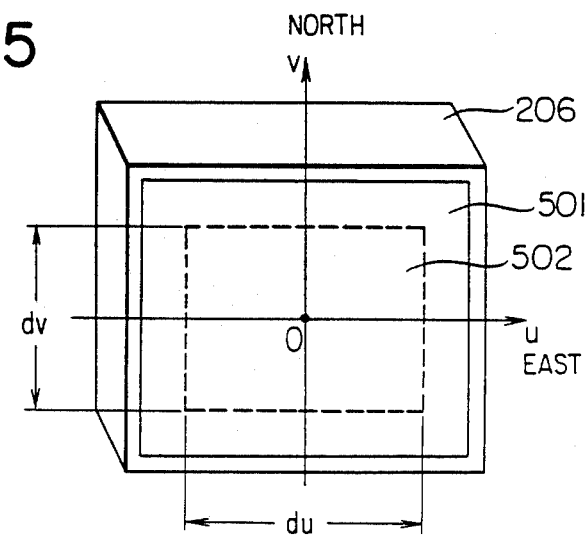
FIG. 5 is an exterior view of a cathode-ray tube.

The cathode-ray tube 206 may be a conventional one, and it has a rectangular screen 501 as shown in FIG. 5. Coordinate axes u and v are Cartesian coordinate axes for indicating coordinates (u, v) in the screen 501. The respective marks (to be described later) of the starting location, the destination location and the current position are displayed on the screen 501. Meanwhile, the control circuit 204 includes a microcomputer 204a, an input circuit 204b and an output circuit 204c which are well known. It reads out the corresponding positional information from the memory 205 on the basis of the place name information applied thereto by manipulating the keyboard 203, determines an appropriate contraction scale in consideration of the positional relationship between the starting location and the destination location and displays the marks indicative of the respective locations on the cathode-ray tube 206. Besides, it is supplied with a signal from the running distance sensor 201 and a signal from the heading sensor 202 to calculate the current position of the vehicle on the basis of them and displays the mark indicative of the current position on the cathode-ray tube 206 in accordance with the predetermined contraction scale.

Figure 6E:
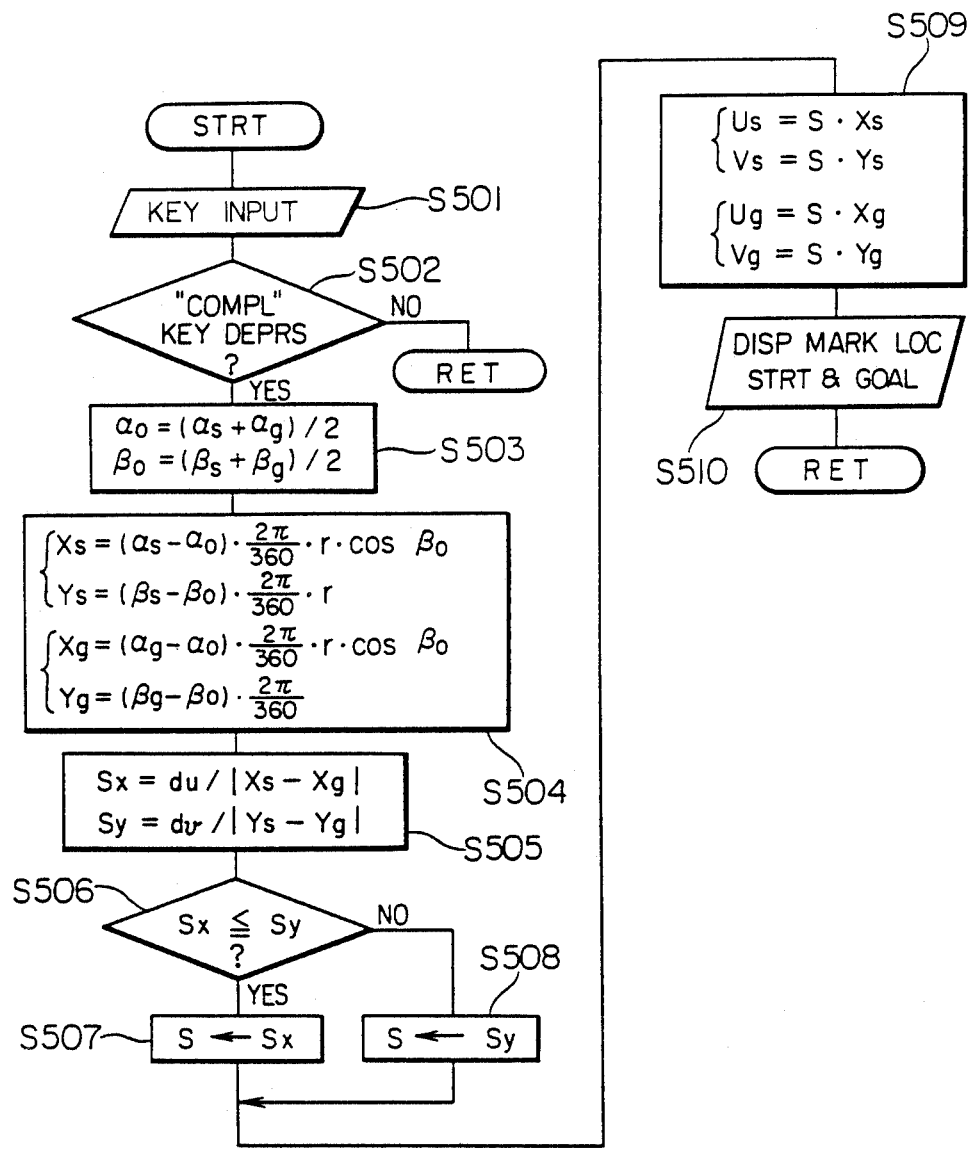

Next, the operation of this invention will be described with reference to FIGS. 6A–6G which are flow charts of programs stored in a memory within the microcomputer 204a. FIG. 6A shows the flow chart of a main routine. The main routine starts upon the initiation of power feed to the control circuit 204. After the variables are initialized at a step S101, the subroutines S102–S105 of a starting location setting process, a destination location setting process, a mark displaying process and a current position setting process are repeatedly executed in succession. A concrete example of use will now be explained. First, a user sets a starting location. In the particular case of "HIMEJI City", respective keys "Starting Location", "HI", "ME", "SHI", " ゛ " and "Set" are successively depressed on the keyboard 203 ("JI"="SHI"+" ゛ "). Thus, in the flow chart of FIG. 6B showing the details of the subroutine S102 of the starting location setting process, the depression of the "Starting Location" key is detected (steps S201, S202), the subroutine S203 of a place name input/location retrieval process is executed. At a step S301 in FIG. 6C which is the flow chart of the subroutine S203, the content of the depressed key is loaded. When the depressed key is decided a letter key at a step S203, it is stored in a memory $P_n$ (n=1, 2, ... ) for storing the letter string of a place name, at a step S303. Each time one letter key is depressed, the steps S301–S303 are executed. Accordingly, "HI" is stored in the memory area $P_1$, "ME" in $P_2$, "SHI" in $P_3$ and " ゛ " in $P_4$. Lastly, the depression of the "Set" key is detected by steps S302 and S304. At a step S305, the memory 305 is retrieved on the basis of the input letter string composed of "HI", "ME", "SHI" and " ゛ ", to find out the location information (memory cells 401a–401g) having the letter string "HI", "ME", "SHI", " ゛ " (at the time of the retrieval, "SHI" and " ゛ " are regarded as "JI"). At a step S306, the corresponding positional information (memory cells 401d–401g) is read out so as to store the contents of the memory cells 401d and 401e in a memory area $\alpha$ and those of the memory cells 401f and 401g in a memory area $\beta$. Next, the control flow returns to a step S204 in FIG. 6B, the retrieved positional information memory items $\alpha$ and $\beta$ are respectively transferred to memory areas $\alpha_s$ and $\beta_s$ for the starting location. The memory items $\alpha_s$ and $\beta_s$ express the longitude and latitude of the starting location, respectively. With the above steps, the setting of the starting location ends. Subsequently, a destination location is input. When "KOUBE City" is selected as the destination location, the depressing order of keys is "Destination Location", "KO", "◊" "U", "HE", "◊" and "Set" ("HE"+" "="BE"). After depressing the "Destination Location" key in lieu of the "Starting Location" key in the case of inputting the starting location, the respective keys may be depressed in the order similar to that for inputting the place name of the starting location. Thus, the subroutine S103 of the destination location setting process in FIG. 6A is executed. FIG. 6D shows the flow chart of this subroutine S103. Steps S401 and S403 are quite the same as the steps S201 and S203 of the flow chart of the starting location setting process shown in FIG. 6B, respectively. In addition, a step S403 renders the decision of the "Destination Location" key instead of the decision of the depression of the "Starting Location" key at the step S202, and a step S404 performs the transfer of the information items to memory areas $\alpha_g$ and $\beta_g$ for the longitude and latitude of the goal or destination location, instead of the transfer of the information to the memory areas $\alpha_s$ and $\beta_s$ at the step S204. The operations of FIG. 6D accordingly become similar to those of FIG. 6B, and shall be omitted from the description.

Since the setting operations of the starting location and the destination location are completed with the above steps, the user depresses the "Completion" key of the keyboard 203. Thus, the subroutine S104 of the mark displaying process in FIG. 6A is executed. FIG. 6E shows the flow chart thereof. First, the depression of the "Completion" key is detected at steps S501 and S502. Subsequently, a step S503 evaluates a longitude $\alpha_o$ at which the respective longitudes of the starting location and the destination location are bisected and also a latitude $\beta_o$ at which the respective latitudes are bisected (refer to FIG. 7). At the next step S504, the starting location $(\alpha_s, \beta_s)$ and the destination location $(\alpha_g, \beta_g)$ which are points on spherical coordinates are transformed into points in a planar x-y Cartesian coordinate system whose origin is the point $(\alpha_o, \beta_o)$ evaluated at the step S503. The transform is performed with the following equations:

$$\begin{cases} X_s = (\alpha_s - \alpha_o) \cdot \frac{2\pi}{360} \cdot r \cdot \cos \beta_o \\ Y_s = (\beta_s - \beta_o) \cdot \frac{2\pi}{360} \cdot r \end{cases}$$

$$\begin{cases} X_g = (\alpha_g - \alpha_o) \frac{2\pi}{360} \cdot r \cdot \cos \beta_o \\ Y_g = (\beta_g - \beta_o) \cdot \frac{2\pi}{360} \cdot r \end{cases}$$

Here, $(X_s, Y_s)$ and $(X_g, Y_g)$ denote the coordinates of the starting location and the goal or destination location on the x-y Cartesian coordinate system, and letter r denotes the radius of the earth. Subsequently, a contraction scale for display is computed at steps S505–S508. At the step S505, the ratios Sx and Sy between rate of change du and dv of the lateral and vertical lengths of a rectangular region 502 set on the cathode-ray tube 206 and the x-direction length $|X_s-X_g|$ and y-direction length $|Y_s-Y_g|$ of the starting location and the goal location on the x-y Cartesian coordinates obtained at the step S504 are computed according to the following equations:

$$S_x = du/|X_s - X_g|$$

$$S_y = dv/|Y_s - Y_g|$$

Figure 8:
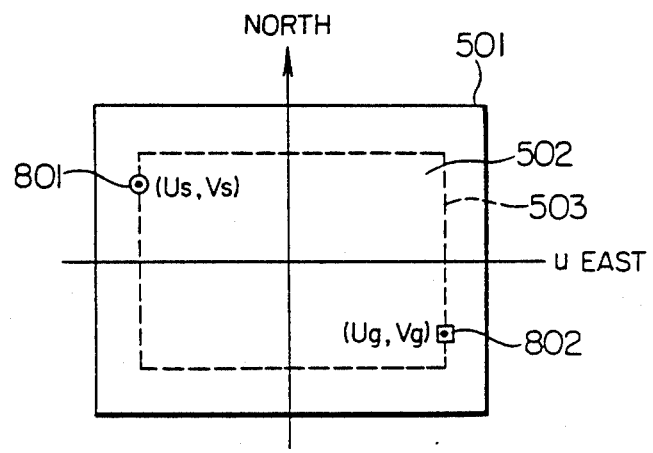
FIG. 8 is a diagram showing an example of display of the cathode-ray tube.

At the steps S506–S508, smaller values are selected for the display contraction scale S. Subsequently, at a step S509, the x-y Cartesian coordinates $(X_s, Y_s)$ and $(X_g, Y_g)$ of the starting location and the goal location are transformed into u-v Cartesian coordinates $(U_s, V_s)$ and $(U_g, V_g)$ on the cathode-ray tube 206 on the basis of the display contraction scale S set as described above, and at a step S510, marks 801 and 802 (refer to FIG. 8) indicative of the starting location and the goal location are displayed on the coordinates. Further, the place name is also displayed, so that it may be visually verified that the input information is correct.

Figure 6F:
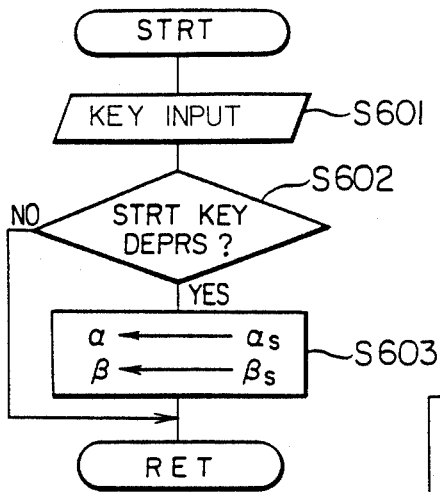

With the above steps, the execution of the subroutine S104 of the mark displaying process ends. By carrying out such a coordinate transform, the starting location and the destination location are displayed on the outer peripheral line 503 of the reactangular region 502 of the cathode-ray tube 206. Next, the subroutines S105 of the current position setting process in FIG. 6A is executed. The flow chart thereof is shown in FIG. 6F. In a case where the vehicle is at a stop at the set starting location, the user may immediately depress the "Start" key. In a case where the vehicle lies at a somewhat distant location, the user depresses the "Start" key upon arrival at the starting location. Then, the key depression is detected at steps S601 and S602. At a step S603, the spherical coordinates $(\alpha_s, \beta_s)$ of the starting location are set to the spherical coordinates $(\alpha, \beta)$ indicating the current position of the vehicle. Apart from such a method of initialization, the longitudinal coordinate $\alpha$ and the latitudinal coordinate $\beta$ indicating the current position of the vehicle may well be directly input by the use of numeral keys (not shown) etc.

Figure 6G:
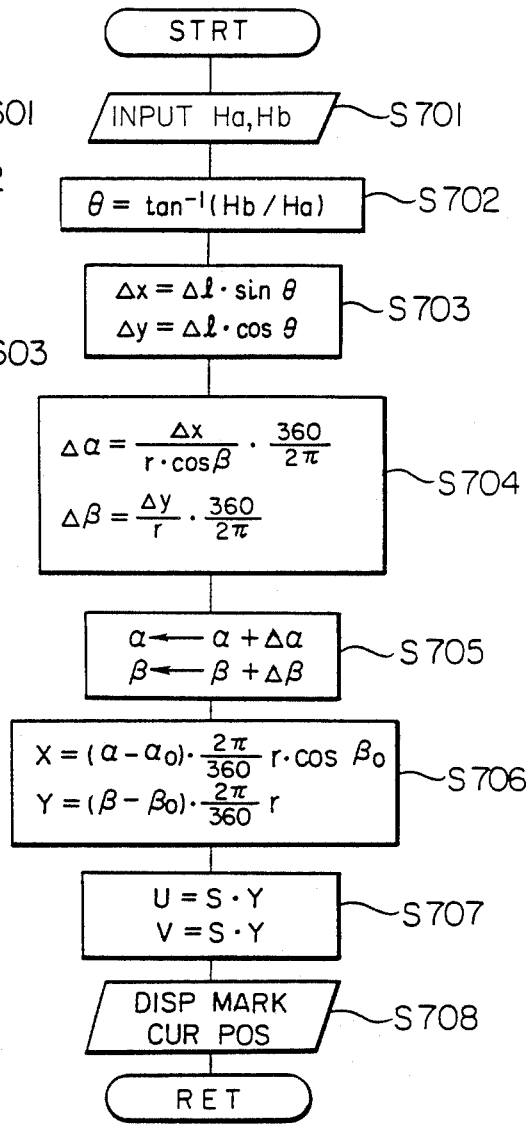

With the above steps, the setting operations of the starting location, the destination location and the current position end. As the vehicle is run, an interrupt signal is input to the microcomputer 204a every unit running distance $\Delta l$ (for example, 1 m) on the basis of the pulse signal provided by the running distance sensor 201, whereby an interrupt process routine the flow chart of which is shown in FIG. 6G is executed. First, at a step S701, the direction signals Ha and Hb from the heading sensor 202 are input. At a step S702, an angle $\theta$ defined between the terrestrial magnetism $\vec{H}$ and the heading 303 of the vehicle 301 as shown in FIG. 3 is calculated in accordance with the following equation:

$$\theta = \tan^{-1}(Hb/Ha)$$

Subsequently, at a step S703, the movement component $\Delta x$ of the unit running distance $\Delta l$ in the easterly or westerly direction and the movement component $\Delta y$ thereof in the southerly or northerly direction are calculated in accordance with the following equations:

$$\Delta x = \Delta l \cdot \sin \theta$$

$$\Delta y = \Delta l \cdot \cos \theta$$

Figure 9:
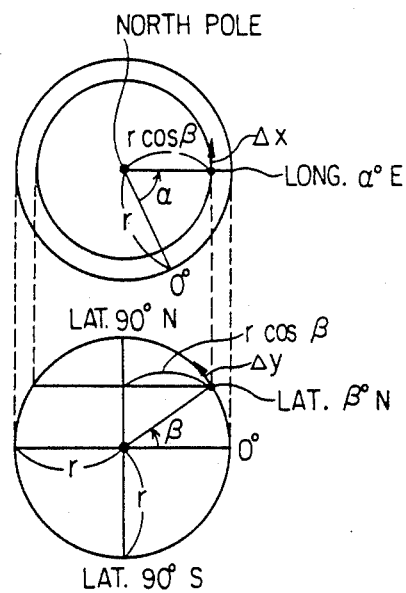
FIG. 9 is a diagram for explaining the conversion of the easterly or westerly direction- and southerly or northerly direction-movement components of a vehicle into variations in longitudinal and latitudinal coordinates.
Figure 10:
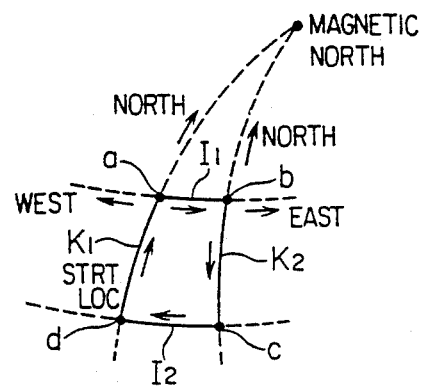
FIG. 10 is a diagram for explaining a problem in a prior-art system.

At the next step S704, the movement components $\Delta x$ and $\Delta y$ evaluated as described above are respectively converted into the variations $\Delta\alpha$ and $\Delta\beta$ of the longitude and the latitude in accordance with the following equations (refer to FIG. 9):

$$\Delta \alpha = \frac{\Delta x}{r \cdot \cos \beta} \cdot \frac{360}{2\pi}$$

$$\Delta \beta = \frac{\Delta y}{r} \cdot \frac{360}{2\pi}$$

At a step S705, the respective variations are added up, thereby to find the longitude $\alpha$ and the latitude $\beta$ of the current position of the vehicle. Subsequently, at a step S706, the longitude $\alpha$ and latitude $\beta$ indicating the current position of the vehicle are converted into a point (X, Y) in the x-y Cartesian coordinates as at the steps S504 in FIG. 6E, and at a step S707, the coordinates (X, Y) are transformed into a point (U, V) in the u-v Cartesian coordinates on the cathode-ray tube 206 as at the step S509 in FIG. 6E. Thereafter, at a step S708, a mark 803 indicating the current position of the vehicle is displayed on the point (U, V) (refer to FIG. 2).

Since this invention is constructed as described above to determine the current position of a vehicle in terms of longitudinal and latitudinal coordinates, the positional computation of the vehicle is accurately performed. In addition, since place names and coordinates are stored as map information, the location information of an extensive region can be stored with a small memory capacity. Further, a starting location and a destination location are set in such a manner that the place names thereof are input thereby to call the coordinates of the locations from a memory. Therefore, positions can be accurately set without referring to a map or the like. Besides, a contraction scale for display is set so that a spherical surface enclosed with the longitudinal coordinates and the latitudinal parallels respectively passing through the starting location and the destination location may correspond to the predetermined rectangular region of a display unit, the starting location and the destination location are displayed on the outer periphery of the rectangular region, and the current position of the vehicle is displayed on the basis of the display contraction scale. Therefore, the errors of the positional correlation among the starting location, destination location and current position on the display unit can be diminished.

As described above, according to this invention, the movement components of a vehicle in an easterly or westerly direction and in a southerly or northerly direction are calculated, the current position of the vehicle is calculated in terms of longitudinal and latitudinal coordinates on the basis of the respective components, and a starting location as well as a destination location set by retrieving location information and the current position of the vehicle obtained by the calculation are displayed on a display unit. Therefore, the invention has the effect that the computation accuracy of the current position of the vehicle and the display accuracies of the respective display points on the display unit are enhanced.

What is claimed is:

1. An on-vehicle navigation system comprising running distance detecting means for detecting a running distance of a vehicle, vehicle heading detection means for detecting a heading of the vehicle, current position setting means for setting initial longitudinal and latitudinal coordinates of a position of the vehicle, movement component calculation means for calculating an easterly or westerly direction-movement component and a southerly or northerly direction-movement component for each vehicle unit running distance from the running distance and heading obtained by both said detecting means, variation calculation means for calculating longitudinal and latitudinal variations per unit running distance of the vehicle on the basis of respective direction-movement components obtained by said movement component calculation means and the latitudinal coordinate of the position of the vehicle determined at every unit running distance, current position calculation means for determining current position of the vehicle in such a way that the longitudinal and latitudinal variations per unit running distance of the vehicle obtained by said variation calculation means are successively added to said initial longitudinal and latitudinal coordinates of the position of the vehicle set by said current position setting means, location information storage means for storing a plurality of location information items corresponding to place names and respective longitudinal and latitudinal coordinates representative thereof, location setting means for setting coordinates of a starting location and a destination location of the vehicle on the basis of said plurality of location information items, and display control means for displaying on a display unit the starting location and the destination location set by said location setting means and the current position of the vehicle obtained by said current position calculation means.

2. An on-vehicle navigation system according to claim 1 wherein said location setting means sets coordinates of the starting and destination locations of the vehicle by retrieving corresponding location information items and respective longitudinal and latitudinal coordinates stored in said location information storage means.

3. An on-vehicle system according to claim 1 wherein said display control means determines a contraction scale for display on the basis of a rectangular region determined by a periphery enclosing a longitudinal meridian and a latitudinal parallel passing through the starting location and a longitudinal meridian and a latitudinal parallel passing through the destination location and displays the current position of the vehicle on the basis of the display contraction scale.

* * * * *